United States Patent
Pinno et al.

(10) Patent No.: US 11,055,316 B2
(45) Date of Patent: Jul. 6, 2021

(54) SYSTEM TO VISUALIZE RELATIONSHIPS WITHIN MULTI-DIMENSIONAL DATA

(71) Applicant: SAP SE, Walldorf (DE)

(72) Inventors: Sebastian Pinno, Worms (DE); Torsten Quast, Heidelberg (DE); Thomas Morent, Worms (DE); Manuel Dewaid, Edingen (DE); Armin Holschbach, Heidelberg (DE); Tim Muenster, Karlsruhe (DE)

(73) Assignee: SAP SE, Walldorf (DE)

( * ) Notice: Subject to any disclaimer, the term of this patent is extended or adjusted under 35 U.S.C. 154(b) by 492 days.

(21) Appl. No.: 16/007,266

(22) Filed: Jun. 13, 2018

(65) Prior Publication Data
US 2019/0384852 A1    Dec. 19, 2019

(51) Int. Cl.
| G06F 16/00 | (2019.01) |
|---|---|
| G06F 16/28 | (2019.01) |
| G06F 16/25 | (2019.01) |
| G06F 16/22 | (2019.01) |
| G06F 16/901 | (2019.01) |
| G06F 16/9535 | (2019.01) |

(52) U.S. Cl.
CPC ........ *G06F 16/283* (2019.01); *G06F 16/2264* (2019.01); *G06F 16/254* (2019.01); *G06F 16/285* (2019.01); *G06F 16/9024* (2019.01); *G06F 16/9535* (2019.01)

(58) Field of Classification Search
CPC ............... G06F 16/285; G06F 16/9024; G06F 16/9535; G06F 16/254; G06F 16/283; G06F 16/2264
See application file for complete search history.

(56) References Cited

U.S. PATENT DOCUMENTS

| 2006/0031187 A1* | 2/2006 | Pyrce | G06F 16/283 |
|---|---|---|---|
| 2016/0259832 A1* | 9/2016 | Shore | G06F 16/9024 |

OTHER PUBLICATIONS

Hsiao et al., "Data Visualization on Web-Based OLAP", DOLAP'22, Oct. 28, 2011, pp. 75-80, DOLAP'11, Proceedings of the ACM 14th International Workshop on Data Warehousing and OLAP. (Year: 2011).*

Zhao et al., "Graph Cube: On Warehousing and OLAP Multidimensional Networks", pp. 853-864, SIGMOD'11, Jun. 12-16, 2011, ACM. (Year: 2011).*

* cited by examiner

*Primary Examiner* — Cheryl Lewis
(74) *Attorney, Agent, or Firm* — Buckley, Maschoff & Talwalkar LLC (57) ABSTRACT

A system includes reception of a user selection of at least two dimensions of a data source, acquisition of data of the data source, the data associating each of a plurality of dimension values of a first dimension of the selected dimensions with one or more of dimension values of a second dimension of the selected dimensions, determination, based on the acquired data, of graph nodes representing dimension values of the first dimension and graph edges connecting the graph nodes and representing dimension values of the second dimension, generation of a graph image comprising the graph nodes and graph edges, and transmission of the graph image to the user.

20 Claims, 9 Drawing Sheets

| Product | Customer | Units |
|---|---|---|
| Product 1 | Customer A | 100 |
| Product 1 | Customer B | 200 |
| Product 2 | Customer A | 100 |
| Product 2 | Customer C | 100 |
| Product 2 | Customer D | 100 |

| Product | Customer | Units |
|---------|----------|-------|
| Product 1 | Customer A | 100 |
| Product 1 | Customer B | 200 |
| Product 2 | Customer A | 100 |
| Product 2 | Customer C | 100 |
| Product 2 | Customer D | 100 |

SYSTEM TO VISUALIZE RELATIONSHIPS WITHIN MULTI-DIMENSIONAL DATA

BACKGROUND

Enterprise software systems receive, generate, and store data related to many aspects of an enterprise. Users operate reporting tools to access such data and display the data in useful formats, such as in graphic visualizations. Specifically, a reporting tool may submit a query to a backend data source and present a visualization of a corresponding result set.

The data is typically multi-dimensional and voluminous. Accordingly, generation of appropriate queries may be difficult without prior knowledge of relationships between dimensions which are exposed within the multi-dimensional data. Moreover, the size of the data renders it unsuitable for ad hoc exploration. Systems are desired to efficiently visualize relationships between dimensions in large multi-dimensional datasets.

DETAILED DESCRIPTION

The following description is provided to enable any person in the art to make and use the described embodiments. Various modifications, however, will remain readily-apparent to those in the art.

Generally, some embodiments provide graph analysis of multi-dimensional datasets to efficiently determine and intuitively illustrate relationships between dimension entities. Some embodiments employ the aggregation capabilities of an On-line Analytical Processing (OLAP) engine to reduce the dataset to the dimensions of interest.

According to some embodiments, a user selects two or more dimensions of a dataset. Data associated with the selected dimensions is retrieved from a backend system, and the data is used to determine relationships between the selected dimensions. A graph is created including nodes representing entities (i.e., values) of one selected dimension and edges representing entities of a second selected dimension. Some embodiments may thereby provide exploration of dimension relationships using a user interface metaphor which is typically used to acquire and display measure values.

Figure 1:
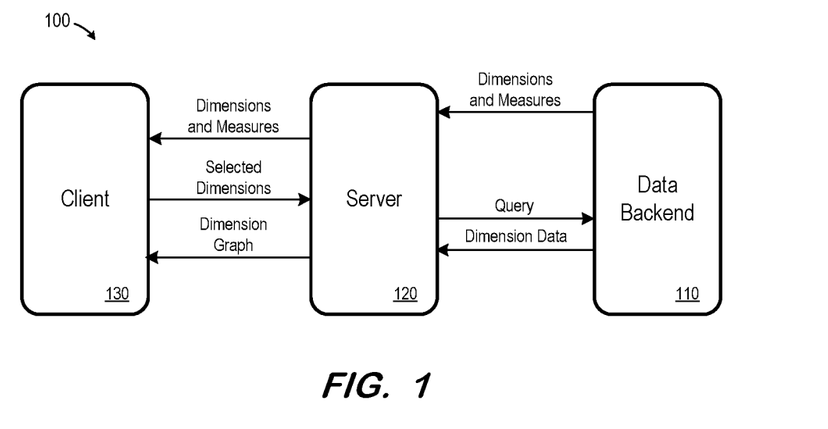
FIG. 1 is a block diagram of a system architecture according to some embodiments.

FIG. 1 is a block diagram of architecture 100 according to some embodiments. Embodiments are not limited to architecture 100 or to a database architecture.

Architecture 100 includes data backend 110, server 120 and client 130. Generally, server 130 executes services to receive requests from applications executing on client 130 and provides results to client 130 based on data stored within data backend 110. Any, component, service, or resource described herein may consist of any number and types of hardware components and software components, which communicate with one another over any number and type of public (e.g., Internet) or private (e.g., on-premise) networks.

The data stored in data backend 110 may be defined by a semantic layer including a set of objects. Each object is a logical entity associated with one or more physical entities (e.g., a physical database table, associated columns of one or more database tables, etc.) of data backend 110. These objects may be classified as dimensions, along which an analysis may be performed (e.g., Year, Country, Product), or measures (e.g., Sales, Profit), whose values can be determined for a given combination of dimension values (e.g., 2006, U.S.A., Televisions). In typical operation, a query from client 130 may specify dimensions, dimension values and/or measures, and metadata of the semantic layer is used to execute the query with respect to the corresponding physical entities of data backend 110.

As illustrated in FIG. 1, data backend 110 may transmit metadata describing its dimensions and measures to server 120, which then transmits the dimensions and measures to client 130. An operator of client 130 selects one or more dimensions and transmits the selections to server 120. Server 120 queries data backend 110 for data associated with the selected dimensions and receives the data therefrom. Next, server 120 generates a graph to illustrate one or more relationships between the selected dimensions and returns the dimension graph to client 130 for display thereon.

Data backend 110 may comprise any sources of datasets which are or become known, including but not limited to database views, spreadsheets, relational databases and/or OLAP cubes. According to some embodiments, new datasets are occasionally stored within data backend 110, and metadata describing these newly-loaded datasets is incorporated into the above-described semantic layer such that the datasets may be queried as described above.

Figure 2:
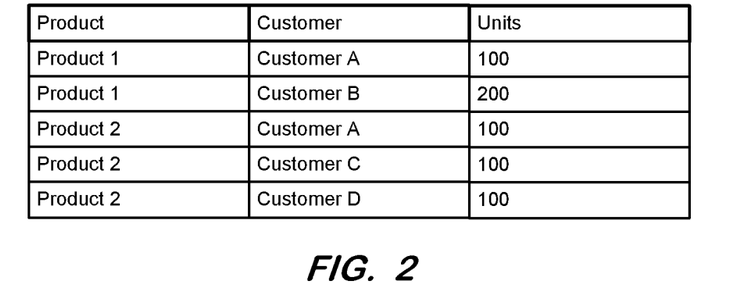
FIG. 2 is a tabular representation of a portion of an OLAP table according to some embodiments.

FIG. 2 illustrates a tabular representation of table 200 according to some embodiments. According to the example, it will be assumed that table 200 is provided to server 120 by data backend 110 in response to user selection of the dimensions Product and Customer. Table 200 may comprise a subset of a fact table having many more columns and stored in data backend 110 and/or may be generated based on several tables stored in data backend 110 using joins, unions, etc. as is known in the art.

Figure 3:
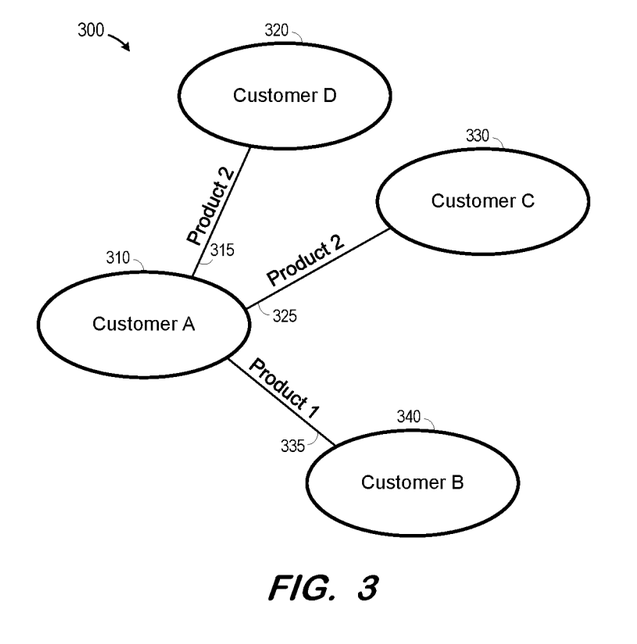
FIG. 3 is a dimension graph generated according to some embodiments.

Dimension graph 300 is generated based on the data of table 200. Each value of the Customer dimension is a node of dimension graph 300, and the nodes are connected by edges representing values of the Product dimension. A node is connected to an edge if the Customer associated with the node has purchased the product associated with the edge.

More specifically, table 200 shows that Customer A and Customer B have each purchased Product 1. Accordingly, graph 300 includes node 310 representing Customer A and node 340 representing Customer B, with edge 335 representing Product 1 and connecting nodes 310 and 340.

Similarly, table 200 shows that Customer A and Customer C have each purchased Product 2. Graph 300 therefore includes edge 325 representing Product 2 and connecting node 310 representing Customer A to node 330 representing Customer C. Graph 300 also includes edge 315 representing Product 2 and connecting node 310 representing Customer A to node 320 representing Customer D. Embodiments may therefore efficiently facilitate the understanding of inter-dimension relationships, which may inform meaningful queries of the underlying data.

According to some embodiments, a dimension graph may reflect measure values associated with the nodes and edges. For example, 300 total units of Product 1 were bought by Customers A and B while 200 total units of Product 2 were bought by Customers A and C. This difference may be illustrated by enhancing edge 335 with respect to edge 325, for example by using a thicker line for edge 335.

Figure 4:
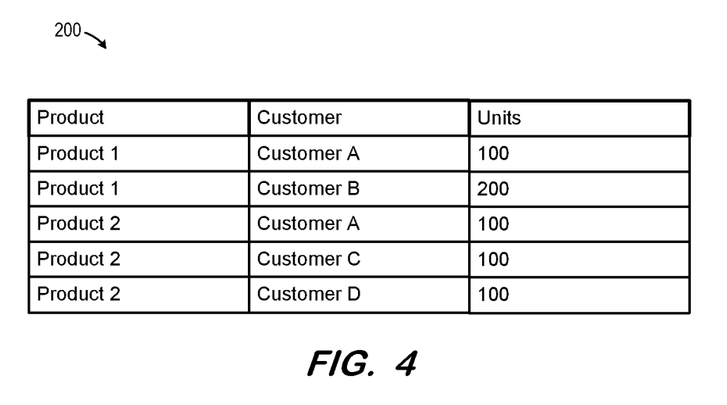
FIG. 4 is a tabular representation of a portion of an OLAP table according to some embodiments.
Figure 5:
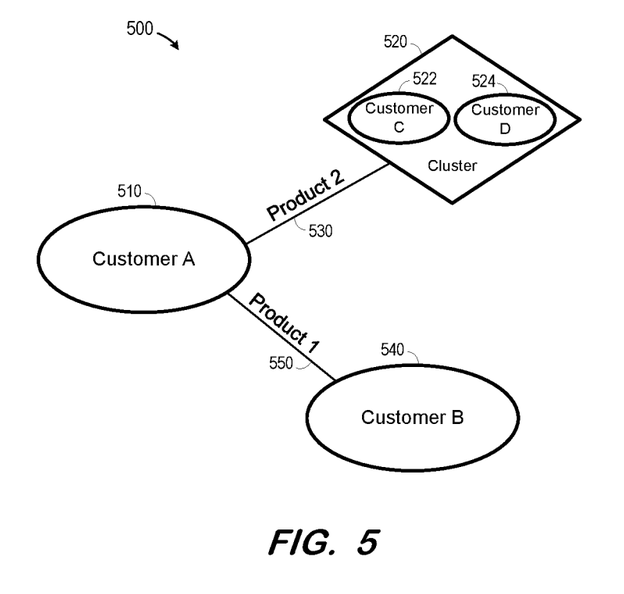
FIG. 5 is a clustered dimension graph generated according to some embodiments.

FIGS. 4 and 5 illustrate a variation of a dimension graph according to some embodiments. FIG. 4 simply re-illustrates table 200 of FIG. 2 for convenience. FIG. 5 illustrates cluster graph 500 based on table 200. It is noted that the nodes representing Customer C and Customer D in graph 300 are both connected to the node representing Customer A by an edge representing Product 2. Cluster graph 500 leverages this commonality by clustering nodes representing Customer C and Customer D into Cluster 520, which is in turn connected to node 510 representing Customer A by edge 530 representing Product 2.

Figure 6:
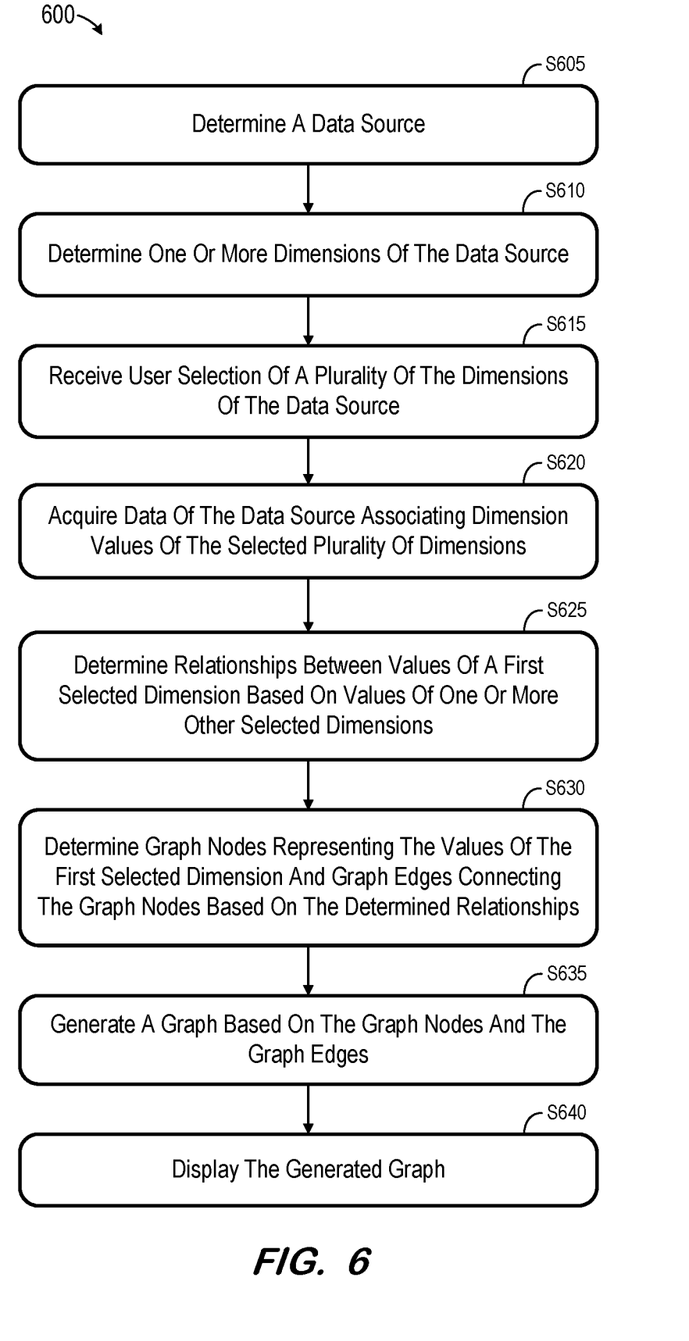
FIG. 6 is a flow diagram of a process according to some embodiments.

FIG. 6 comprises a flow diagram of process 600 to generate a dimension graph according to some embodiments. In some embodiments, processing units (e.g., one or more processors, processing cores, processor threads) of a computing system execute software program code to cause the computing system to perform process 600. Execution of process 600 may be distributed among several computing nodes. Process 600 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a data source is determined at S605. The data source may comprise an OLAP cube stored in data backend 110 according to some embodiments. The data source may be determined based on user input.

Figure 7:
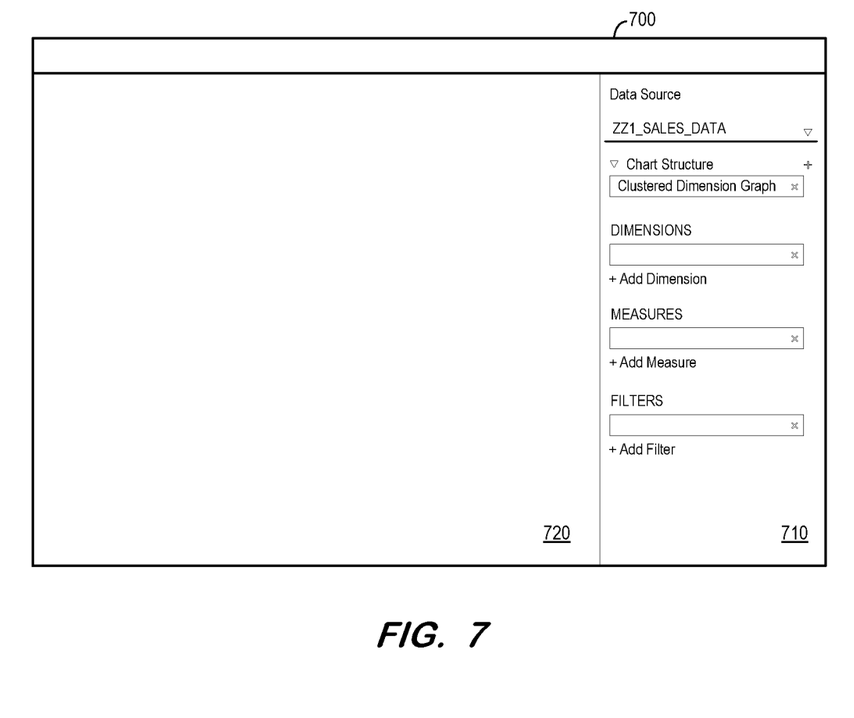
FIG. 7 is a view of a user interface to request a dimension graph according to some embodiments.

For example, FIG. 7 illustrates interface 700 to receive user selection of a data source according to some embodiments. Embodiments are not limited to interface 700. Interface 700 may comprise a Web page provided by server 120 in response to a request from a Web browser application executing on client 130. Any client application may be used to display interface 700, which is not limited to Web-based formats.

Interface 700 includes input area 710 and display area 720 in which to display graphical visualizations according to some embodiments. As shown in area 710, a user has selected a data source (i.e., ZZ1_SALES_DATA) and a "Clustered Dimension Graph" to display in area 720. In addition to a Chart Structure selection box, input area 710 includes drop-down boxes and other user interface input elements for specifying dimensions, measures and filters. Interface 700 may therefore be used to define and display traditional business intelligence data visualizations, such as Sales charts or the like, in addition to the graphs of the present disclosure.

According to some embodiments, flow proceeds from S605 to S610 upon user selection of a Clustered Dimension Graph. One or more dimensions of the selected data source are determined at S610. For example, server 120 may receive the selection of a Clustered Dimension Graph from client 130 and, in response, may request information regarding the one or more dimensions of the selected data source from data backend 110 using known protocols. The information is received by server 120 and returned to client 130. The information may also include metadata regarding measures, hierarchies and other logical objects of the data source.

Figure 8:
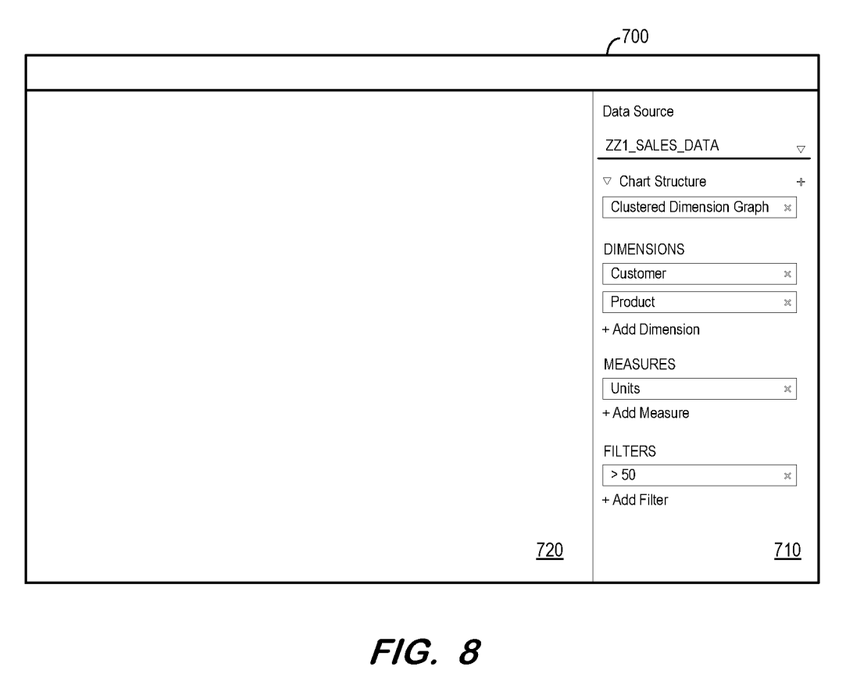
FIG. 8 is a view of a user interface to request a dimension graph according to some embodiments.

Returning to the present example, the information may be used to populate the drop-down boxes of input area 710. FIG. 8 illustrates user interface 700 after user selection of the dimensions Customer and Product using the thusly-populated drop-down boxes of area 710. Area 710 of FIG. 8 also includes user-specified measures and filters. The selection is received, for example by server 120, at S615.

Next, at S620, data of the selected data source is acquired which associates values of the selected dimensions. Such data is represented by table 200 described above. The data may be filtered according to a measure filter which is selected along with the one or more dimensions at S615. Acquisition of the data source may comprise generating and executing appropriate OLAP queries. According to some embodiments, and as described below, these queries are generated and executed by an OLAP engine within server 120, which may relieve client 130 of significant processing load.

Based on the data, relationships between values of a first selected dimension are determined at S625. More specifically, the relationships are determined based on values of at least one other selected dimension. With reference to the above example, relationships between values of the Customer dimension (e.g., dimension values Customer A and Customer B) are determined based on the values of the Product dimension. Graph nodes and graph edges connecting the graph nodes are determined at S630 based on the determined relationships (e.g., both Customer A and Customer B purchased Product 1).

Figure 9:
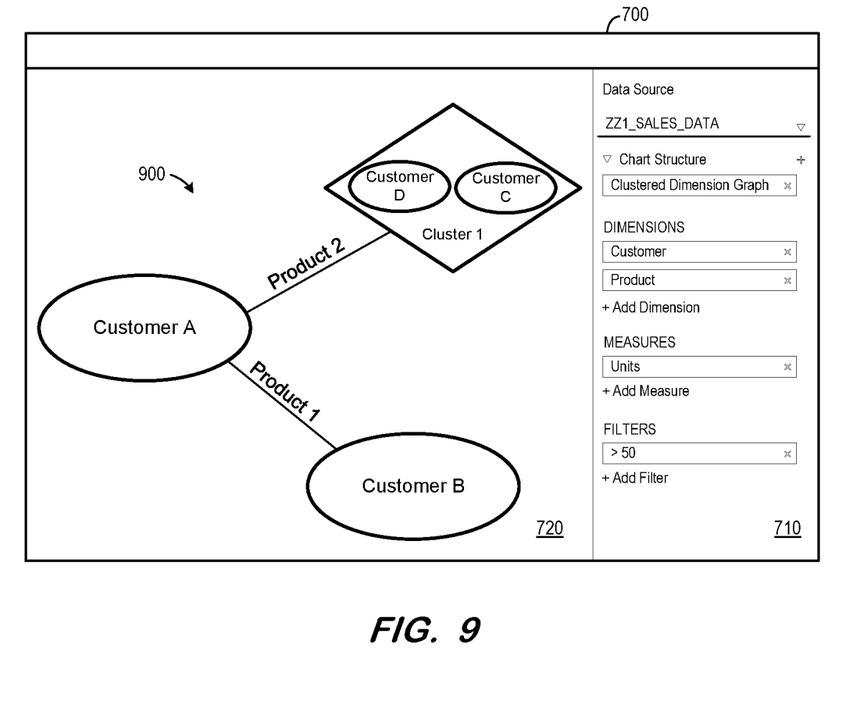
FIG. 9 is a view of a user interface to display a dimension graph according to some embodiments.

A graphic visualization of a graph is generated at S635 based on the determined graph nodes and graph edges. In some embodiments, server 120 generates the graph at S635 using known systems to generate a graph based on specified nodes and edges. S635 may alternatively be executed by client 130. The graph is displayed at S640 as shown in FIG. 9. In the present example, graph 900 is a clustered dimension graph as requested. Accordingly, S635 was executed to cluster the nodes associated with common edges.

Figure 10:
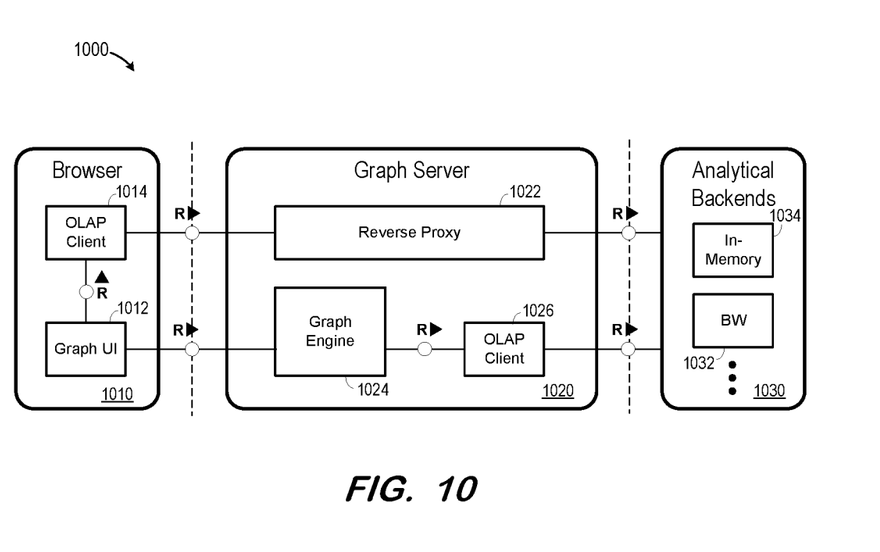
FIG. 10 is a block diagram of a system architecture according to some embodiments.

System 1000 of FIG. 10 may comprise an implementation of system 100 and/or of process 600 according to some embodiments. More specifically, browser 1010, graph server 1020 and analytical backends 1030 may comprise implementations of client 130, server 120 and data backend 110, respectively.

In some embodiments, browser 1010 executes graph UI 1012 to generate a user interface such as interface 700. In response to user selection of a data source at S605, graph UI 1012 uses OLAP client 1014 to send a request for corresponding metadata to analytical backends 1030 through reverse proxy 1022 of graph server 1020. Reverse proxy 1022 is a type of proxy server that retrieves resources on behalf of a client from one or more Web servers as if the resources originated from the Web servers themselves. The returned metadata specifies the dimensions and measures of the selected data source.

Graph UI 1012 then facilitates selection of dimensions of the data source as described above. Based on those selections, OLAP client 1014 generates but does not execute an OLAP query. Rather, the OLAP query is sent to graph engine 1024 of graph server 1020. OLAP client 1026 executes the query to retrieve a result set at S620. Graph engine 1024 generates the nodes and edges of a graph based on the result set at S625 and S630. Execution of the OLAP query at server 1020 may reduce processing demands on browser 1010, and allows caching of the results on server 1020 for use by another user.

According to some embodiments, graph server 1020 may augment nodes and edges of a graph with additional information. For example, a first node Customer A and a second node Customer B are connected by a first edge Product 1. Second node Customer B is also connected to other nodes via other edges. Graph server 1020 determines a highest-weighted edge (e.g., where weight is directly proportional to number of product units) connected to the second node Customer B and indicates the product associated with the highest-weighted edge as a suggested product for Customer A.

Figure 11:
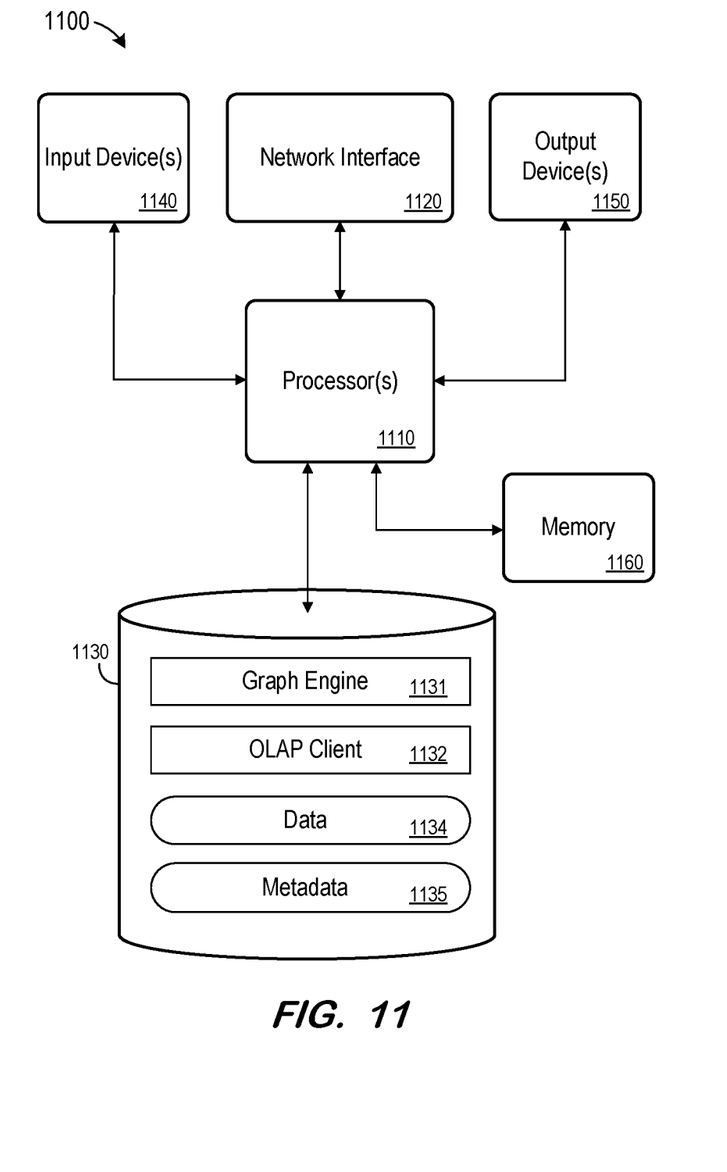
FIG. 11 is a block diagram of an apparatus according to some embodiments.

FIG. 11 is a block diagram of apparatus 1100 according to some embodiments. Apparatus 1100 may comprise a general-purpose computing apparatus and may execute program code to perform any of the functions described herein. Apparatus 1100 may comprise an implementation of server 120 and/or server 1020 in some embodiments. Apparatus 1100 may include other unshown elements according to some embodiments.

Apparatus 1100 includes processor(s) 1110 operatively coupled to network interface 1120, data storage device 1130, one or more input devices 1140, one or more output devices 1150 and memory 1160. Network interface 1120 may and facilitate communication with external devices, such as clients, or a data backends. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM), Storage Class Memory (SCM) or any other fast-access memory.

Graph engine 1131 and OLAP client 1132 may comprise program code and/or libraries executed by processor(s) 1110 to cause apparatus 1100 to perform any one or more of the processes described herein. Embodiments are not limited to execution of these processes by a single apparatus.

Data 1134 may comprise OLAP result sets, graph nodes and associated graph edges determined from the result sets, and any other suitable data. Metadata 1135 may include information regarding dimensions, dimension values, dimension hierarchies, and measures associated with data sources in communication with apparatus 1100. Data storage device 1130 may also store data and other program code for providing additional functionality and/or which are necessary for operation of apparatus 1100, such as device drivers, operating system files, etc. Data 1134 and metadata 1135 may be stored in volatile memory such as memory 1160.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a memory storing processor-executable process steps; and
   a processor to execute the processor-executable process steps to cause the system to:
      receive a user selection of a data source;
      in response to the user selection of the data source, query the data source for dimension and measure metadata, the querying of the data source for dimension and measure metadata includes receiving an OLAP query from the user at a reverse proxy and forwarding the OLAP query to the data source;
      return the dimension and measure metadata to the user;
      receive a user selection of at least two dimensions of the data source;
      acquire data of the data source, the data associating each of a plurality of dimension values of a first dimension of the selected dimensions with one or more of dimension values of a second dimension of the selected dimensions;
      determine, based on the acquired data, graph nodes representing dimension values of the first dimension and graph edges connecting the graph nodes and representing dimension values of the second dimension;
      generate a graph image comprising the graph nodes and graph edges; and
      transmit the graph image to the user.

2. A system according to claim 1, wherein generation of the graph image comprises clustering graph nodes associated with a same graph edge connected to a same graph node into a single cluster connected to the same graph edge.

3. A system according to claim 2, wherein generation of the graph image comprises determination of a suggested relationship between a first dimension value of the first dimension and a second dimension value of the second dimension, the determination based on a graph edge connecting a first graph node representing the first dimension value to a second graph node representing a third dimension value of the first dimension, and a second graph edge connected to the second graph node and representing the second dimension value of the second dimension.

4. A system according to claim 1, wherein acquisition of the data of the data source comprises reception of a second OLAP query from the user and execution of the second OLAP query.

5. A system according to claim 1, the processor further to execute the processor-executable process steps to cause the system to:
receive a user selection of a measure filter,
wherein acquisition of the data of the data source comprises querying the data source, using the measure filter, for the data associating each of a plurality of first dimension values of a first dimension of the selected dimensions with one or more of second dimension values of a second dimension of the selected dimensions.

6. A method comprising:
receiving a user selection of a data source:
in response to the user selection of the data source, querying the data source for dimension and measure metadata, the querying of the data source for dimension and measure metadata includes receiving an OLAP query from the user at a reverse proxy and forwarding the OLAP query to the data source; and
returning the dimension and measure metadata to the user
receiving a user selection of at least two dimensions of the data source;
acquiring data of the data source, the data associating each of a plurality of dimension values of a first dimension of the selected dimensions with one or more of dimension values of a second dimension of the selected dimensions;
determining, based on the acquired data, graph nodes representing dimension values of the first dimension and graph edges connecting the graph nodes and representing dimension values of the second dimension; and
generating a graph image based on the graph nodes and graph edges.

7. A method according to claim 6, wherein generating the graph image comprises clustering graph nodes associated with a same graph edge connected to a same graph node into a single cluster connected to the same graph edge.

8. A method according to claim 7, wherein generating the graph image comprises determining a suggested relationship between a first dimension value of the first dimension and a second dimension value of the second dimension, the determination based on a graph edge connecting a first graph node representing the first dimension value to a second graph node representing a third dimension value of the first dimension, and a second graph edge connected to the second graph node and representing the second dimension value of the second dimension.

9. A method according to claim 6, wherein acquiring the data of the data source comprises receiving a second OLAP query from the user and executing the second OLAP query.

10. A method according to claim 6, further comprising:
receiving a user selection of a measure filter,
wherein acquiring the data of the data source comprises querying the data source, using the measure filter, for the data associating each of a plurality of first dimension values of a first dimension of the selected dimensions with one or more of second dimension values of a second dimension of the selected dimensions.

11. A system comprising:
a client computing system to execute a client user interface application and a first OLAP client library; and
a server computing system to execute a reverse proxy, a graph engine and a second OLAP client library,
the client user interface application to receive a user selection of at least two dimensions of a data source,
the second OLAP client to acquire data of the data source, the data associating each of a plurality of dimension values of a first dimension of the selected dimensions with one or more of dimension values of a second dimension of the selected dimensions, and
the graph engine to:
determine, based on the acquired data, graph nodes representing dimension values of the first dimension and graph edges connecting the graph nodes and representing dimension values of the second dimension;
generate a graph image comprising the graph nodes and graph edges; and
transmit the graph image to the client user interface application.

12. A system according to claim 11, wherein generation of the graph image comprises clustering graph nodes associated with a same graph edge connected to a same graph node into a single cluster connected to the same graph edge.

13. A system according to claim 11,
the client user interface application to receive a user selection of the data source,
in response to the user selection of the data source, the first OLAP client library to query the data source for dimension and measure metadata, and
the reverse proxy to receive the query, to forward the query to the data source, and to return the dimension and measure metadata to the first OLAP client.

14. A system according to claim 13, wherein acquisition of the data of the data source comprises reception of a second OLAP query from the first OLAP client library and execution of the second OLAP query by the second OLAP client library.

15. A system according to claim 11, wherein acquisition of the data of the data source comprises reception of a second OLAP query from the first OLAP client library and execution of the second OLAP query by the second OLAP client library.

16. A system according to claim 11,
the client user interface application to receive a user selection of a measure filter,
wherein acquisition of the data of the data source comprises executing the second OLAP client library to query the data source, using the measure filter, for the data associating each of a plurality of first dimension values of a first dimension of the selected dimensions with one or more of second dimension values of a second dimension of the selected dimensions.

17. A non-transitory computer-readable medium storing program instructions that when executed cause a processor to perform a method comprising:
receiving a user selection of a data source;
in response to the user selection of the data source, querying the data source for dimension and measure metadata, the querying of the data source for dimension and measure metadata includes receiving an OLAP query from the user at a reverse proxy and forwarding the OLAP query to the data source; and returning the dimension and measure metadata to the user receiving a user selection of at least two dimensions of the data source;

acquiring data of the data source, the data associating each of a plurality of dimension values of a first dimension of the selected dimensions with one or more of dimension values of a second dimension of the selected dimensions;

determining, based on the acquired data, graph nodes representing dimension values of the first dimension and graph edges connecting the graph nodes and representing dimension values of the second dimension; and generating a graph image based on the graph nodes and graph edges.

18. A non-transitory computer-readable medium according to claim 17, wherein generating the graph image comprises clustering graph nodes associated with a same graph edge connected to a same graph node into a single cluster connected to the same graph edge.

19. A non-transitory computer-readable medium according to claim 18, wherein generating the graph image comprises determining a suggested relationship between a first dimension value of the first dimension and a second dimension value of the second dimension, the determination based on a graph edge connecting a first graph node representing the first dimension value to a second graph node representing a third dimension value of the first dimension, and a second graph edge connected to the second graph node and representing the second dimension value of the second dimension.

20. A non-transitory computer-readable medium according to claim 17, wherein acquisition of the data of the data source comprises reception of a second OLAP query from the user and execution of the second OLAP query.

* * * * *